(12) United States Patent
Nitta (10) Patent No.: US 10,120,610 B2
(45) Date of Patent: Nov. 6, 2018

(54) ELECTRONIC APPARATUS, INFORMATION PROCESSING METHOD, AND NON-TRANSITORY COMPUTER READABLE RECORDING MEDIUM

(71) Applicant: KYOCERA DOCUMENT SOLUTIONS INC., Osaka (JP)

(72) Inventor: Kenichiro Nitta, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 29 days.

(21) Appl. No.: 15/231,895

(22) Filed: Aug. 9, 2016

(65) Prior Publication Data

US 2017/0090818 A1    Mar. 30, 2017

(30) Foreign Application Priority Data

Sep. 29, 2015   (JP) ................. 2015-190690

(51) Int. Cl.
  *G06F 3/06* (2006.01)
  *H04N 1/21* (2006.01)

(52) U.S. Cl.
  CPC .......... *G06F 3/0644* (2013.01); *G06F 3/0604* (2013.01); *G06F 3/0683* (2013.01); *H04N 1/21* (2013.01)

(58) Field of Classification Search
  CPC .................................................. G06F 3/0644
  See application file for complete search history.

(56) References Cited

U.S. PATENT DOCUMENTS

| | | | | |
|---|---|---|---|---|
| 6,941,430 B2* | 9/2005 | Jones | ......... | G06F 8/67 |
| | | | | 707/999.202 |
| 2007/0050430 A1* | 3/2007 | Meller | ......... | G06F 8/665 |
| 2011/0138148 A1* | 6/2011 | Friedman | ......... | G06F 3/0613 |
| | | | | 711/173 |
| 2014/0281125 A1* | 9/2014 | Meller | ......... | G06F 12/0246 |
| | | | | 711/103 |

FOREIGN PATENT DOCUMENTS

| | | |
|---|---|---|
| JP | 1995013830 A | 1/1995 |
| JP | 1996314773 A | 11/1996 |
| JP | 2009-245251 A | 10/2009 |
| JP | 2010-086363 A | 4/2010 |
| JP | 2013-117910 A | 6/2013 |

OTHER PUBLICATIONS

ASCII PC, Japan, ASCII Corporation, Jul. 1, 2007, vol. 10, No. 7, pp. 96-97.

* cited by examiner

*Primary Examiner* — Edward J Dudek, Jr.
*Assistant Examiner* — Andrew Russell
(74) *Attorney, Agent, or Firm* — Li & Cai Intellectual Property (USA) Office (57) ABSTRACT

An electronic apparatus includes: a first storage unit divided into a plurality of first partitions that are used for respectively executing a plurality of different functions; a second storage unit different from the first storage unit; and a processor that acquires a size change request for changing a size of at least one of the first partitions, carries out processing for changing the size of at least one of the first partitions upon acquiring the size change request, and uses the second storage unit in executing at least one of the functions during the size change processing.

13 Claims, 13 Drawing Sheets

ELECTRONIC APPARATUS, INFORMATION PROCESSING METHOD, AND NON-TRANSITORY COMPUTER READABLE RECORDING MEDIUM

INCORPORATION BY REFERENCE

This application claims the benefit of Japanese Priority Patent Application JP 2015-190690 filed Sep. 29, 2015, the entire contents of which are incorporated herein by reference.

FIELD

The present disclosure relates to an electronic apparatus including a storage unit divided into a plurality of partitions, an information processing method executed by the electronic apparatus, and a non-transitory computer readable recording medium.

BACKGROUND

A storage unit of an electronic apparatus is divided into a plurality of partitions according to functions, and the size of each partition is usually fixed. There is proposed a technique of changing the size of partitions.

SUMMARY

An electronic apparatus according to an embodiment of the present disclosure includes:
a first storage unit divided into a plurality of first partitions that are used for respectively executing a plurality of different functions;
a second storage unit different from the first storage unit; and
a processor that
acquires a size change request for changing a size of at least one of the first partitions,
carries out processing for changing the size of at least one of the first partitions upon acquiring the size change request, and
uses the second storage unit in executing at least one of the functions during the size change processing.

An information processing method according to an embodiment of the present disclosure is executed by a processor of an electronic apparatus including a first storage unit divided into a plurality of first partitions that are used for respectively executing a plurality of different functions and a second storage unit different from the first storage unit. The information processing method includes:
acquiring a size change request for changing a size of at least one of the first partitions;
carrying out processing for changing the size of at least one of the first partitions upon acquiring the size change request; and
using the second storage unit in executing at least one of the functions during the size change processing.

A non-transitory computer readable recording medium according to an embodiment of the present disclosure records an information processing program executable by a computer of an electronic apparatus including a first storage unit divided into a plurality of first partitions that are used for respectively executing a plurality of different functions and a second storage unit different from the first storage unit. The program causes the computer of the electronic apparatus to:

acquire a size change request for changing a size of at least one of the first partitions;
carry out processing for changing the size of at least one of the first partitions upon acquiring the size change request; and
use the second storage unit in executing at least one of the functions during the size change processing.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings. In this embodiment, an image forming apparatus (typically Multifunction Peripheral; hereinafter referred to as MFP) is exemplified as an electronic apparatus.

1. SYSTEM CONFIGURATION OF MFP

Figure 1:
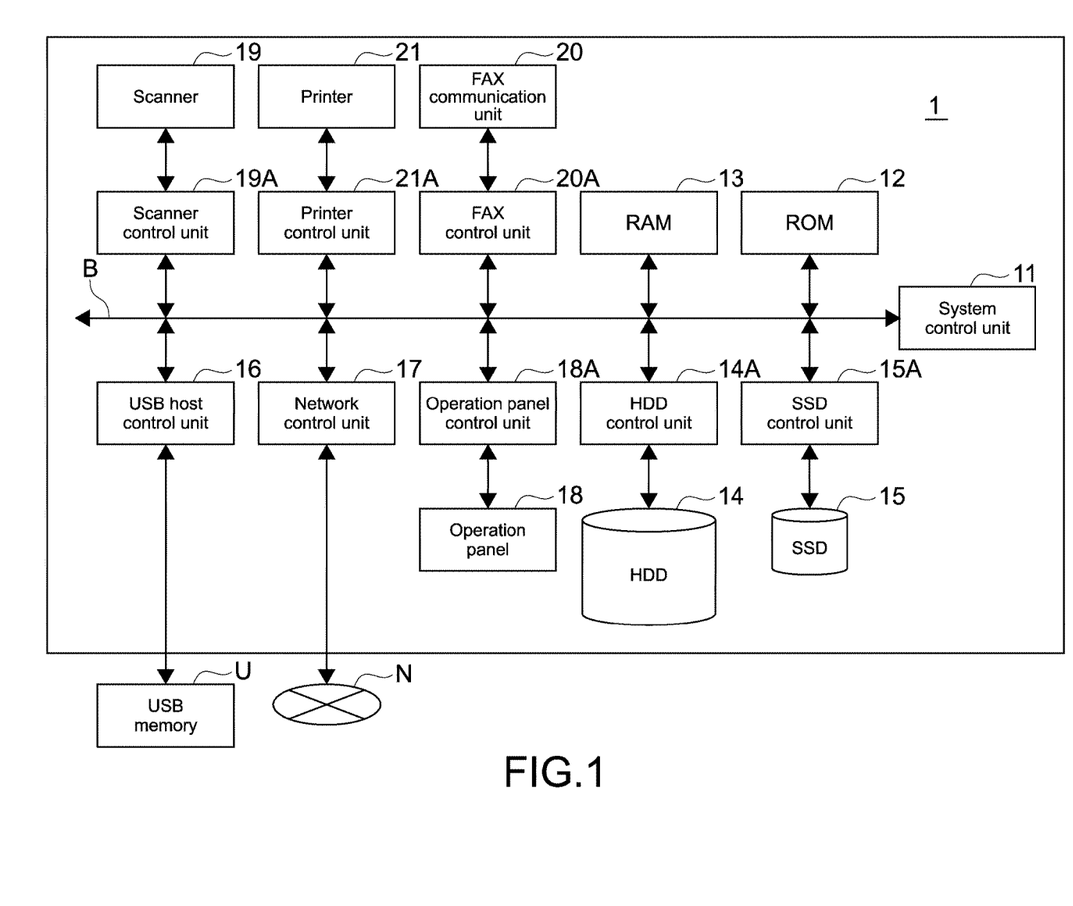
FIG. 1 shows a system configuration of an MFP according to an embodiment of the present disclosure.

FIG. 1 shows a system configuration of an MFP according to the embodiment of the present disclosure.

An MFP 1 includes a system control unit 11, a ROM (Read Only Memory) 12, a RAM (Random Access Memory) 13, an HDD (Hard Disk Drive) 14, an HDD control unit 14A, an SSD (Solid State Drive) 15, an SSD control unit 15A, a USB (Universal Serial Bus) host control unit 16, a network control unit 17, an operation panel 18, an operation panel control unit 18A, a scanner 19, a scanner control unit 19A, a FAX communication unit 20, a FAX control unit 20A, a printer 21, and a printer control unit 21A, that are mutually connected via a bus B.

The system control unit 11 is constituted of a CPU (Central Processing Unit) and the like. The system control unit 11 executes programs such as an information processing program loaded to the RAM 13.

The ROM 12 is a non-transitory computer readable recording medium that fixedly stores programs to be executed by the system control unit 11, data, and the like. The ROM 12 stores a bootloader, for example. The bootloader is a program for loading a program such as an OS (Operating System) stored in the SSD 15 to the RAM 13 when turning on power of the MFP 1 or resetting the MFP 1.

Programs stored in the ROM 12 are loaded to the RAM 13.

The HDD 14 is a large-capacity nonvolatile memory and stores various types of data under control of the HDD control unit 14A. The HDD control unit 14A is typically constituted of a CPU and the like.

The SSD 15 is a large-capacity nonvolatile memory and stores various types of data under control of the SSD control unit 15A. The SSD control unit 15A is typically constituted of a CPU and the like.

The USB host control unit 16 performs control for connecting peripheral devices (e.g., USB memory U) to the MFP 1 as a host apparatus.

The network control unit 17 is an interface for connecting to a network N. The network N is, for example, the Internet or a LAN (Local Area Network).

The operation panel 18 is a touch panel that receives user instructions and is controlled by the operation panel control unit 18A. The operation panel 18 includes a display unit such as an LCD (Liquid Crystal Display).

The scanner 19 optically acquires a manuscript image and generates image data.

The FAX communication unit 20 exchanges facsimile data with external facsimile apparatuses.

The printer 21 prints an image generated based on the image data onto a recording paper. The image data includes image data of a manuscript read by the scanner 19, image data received from an external personal computer or the like via the network control unit 17, and facsimile data received from an external facsimile apparatus by the FAX communication unit 20.

The scanner 19, the FAX communication unit 20, and the printer 21 are respectively controlled by the scanner control unit 19A, the FAX control unit 20A, and the printer control unit 21A. The scanner control unit 19A, the FAX control unit 20A, and the printer control unit 21A may each be constituted of a board (substrate) on which dedicated hardware circuits are mounted, a CPU, or the like.

2. MEMORY CONFIGURATIONS OF HDD AND SSD

Figure 2:
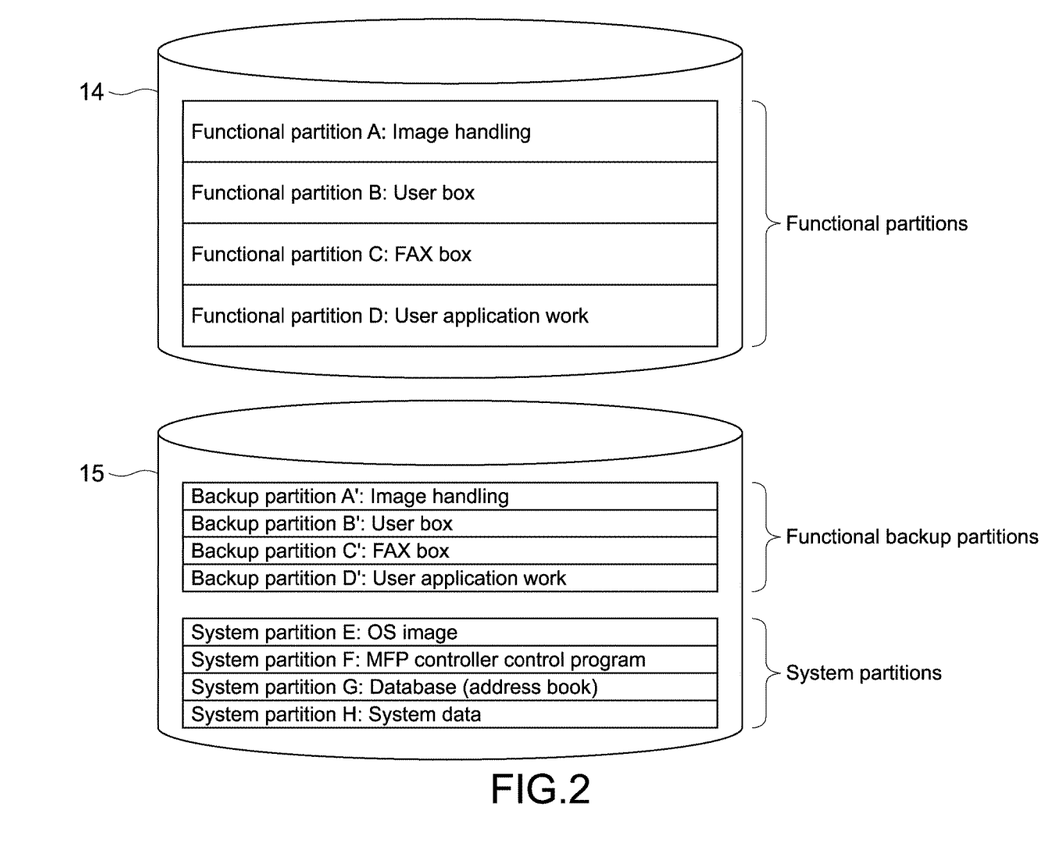
FIG. 2 shows memory configurations of an HDD and SSD.

FIG. 2 shows memory configurations of the HDD and SSD.

A storage area of the HDD 14 (first storage unit) is divided into a plurality of functional partitions A to D (first partitions). The "functional partitions" are partitions used for respectively executing a plurality of different functions of application software.

For example, the functional partition A of the HDD 14 is a partition for image handling. The functional partition A stores image data generated when a printing function, a copy function, and a scanner function are used. The functional partition B is a partition for a user box that stores data on jobs for each user. The functional partition C is a partition for a FAX box that stores facsimile data. The functional partition D is a partition for a user application work. The functional partition D stores data generated when a user application is executed.

A storage area of the SSD 15 (second storage unit) is divided into a plurality of functional backup partitions A' to D' (second partitions) and a plurality of system partitions E to H. The "system partitions" are partitions used for respectively executing a plurality of different functions of system software (OS etc.).

The functional backup partitions A' to D' of the SSD 15 respectively correspond to the plurality of different functions of the application software executed using the functional partitions A to D of the HDD 14. Specifically, in this embodiment, the backup partition A' of the SSD 15 is a partition for image handling. The backup partition B' is a partition for a user box. The backup partition C' is a partition for a FAX box. The backup partition D' is a partition for a user application work.

For example, the system partition E of the SSD 15 is a partition for an OS image. The system partition F is a partition for an MFP controller control program. The system partition G is a partition for an address book database. The system partition H is a partition for system data.

Relationships among the functional partitions A to D of the HDD 14 and the backup partitions A' to D' of the SSD 15 will be described. Typically, the storage capacity of the HDD 14 is larger than that of the SSD 15. Therefore, the HDD 14 is used as a main storage apparatus, and the SSD 15 is used as an auxiliary (alternative) storage apparatus. Specifically, in executing the plurality of different functions of the application software, the system control unit 11 normally uses the functional partitions A to D of the HDD 14. In contrast, only during an operation failure of the HDD 14, for example, the system control unit 11 uses the backup partitions A' to D' of the SSD 15 as auxiliary (alternative) partitions. When using the backup partitions A' to D' of the SSD 15, the system control unit 11 may limit a data amount to be handled in each of the backup partitions A' to D'. For example, the system control unit 11 may limit the capacity of the user box for each user, that is allocated to the backup partition B', or may limit the data amount to be handled in the backup partition A' by inhibiting printing of a specific number of pages more.

3. GENERAL OUTLINE OF THIS EMBODIMENT

In a typical MFP 1, the sizes of the functional partitions A to D of the HDD 14 are fixed and are not assumed to be changed ex-post facto. However, depending on usage conditions of the MFP 1, a situation where a use frequency of a specific partition is significantly low (including case where partition is not used at all) may occur. For example, when the facsimile function of the MFP 1 is not used at all, the functional partition C of the HDD 14 for a FAX box is not used at all.

In this regard, in this embodiment, the sizes of the functional partitions A to D of the HDD 14 can be changed (enlarged/reduced) according to the usage conditions of the MFP 1. As a result, the functional partitions A to D of the HDD 14 can each be made to correspond to the size matching the user's needs.

However, for changing the sizes of the functional partitions A to D of the HDD 14, it is necessary to evacuate data stored in the functional partitions A to D, change the sizes of (reconfigure) the functional partitions A to D, and format the reconfigured functional partitions A to D. There is a problem that the MFP 1 cannot be operated during such a series of size change processing.

In view of the circumstances as described above, in this embodiment, the backup partitions A' to D' of the SSD 15 as partitions prepared preliminarily (alternatively) are used. Accordingly, the MFP 1 can be operated during the series of size change processing on the functional partitions A to D of the HDD 14.

4. HDD PARTITION SIZE CHANGE PROCESSING

Figure 3:
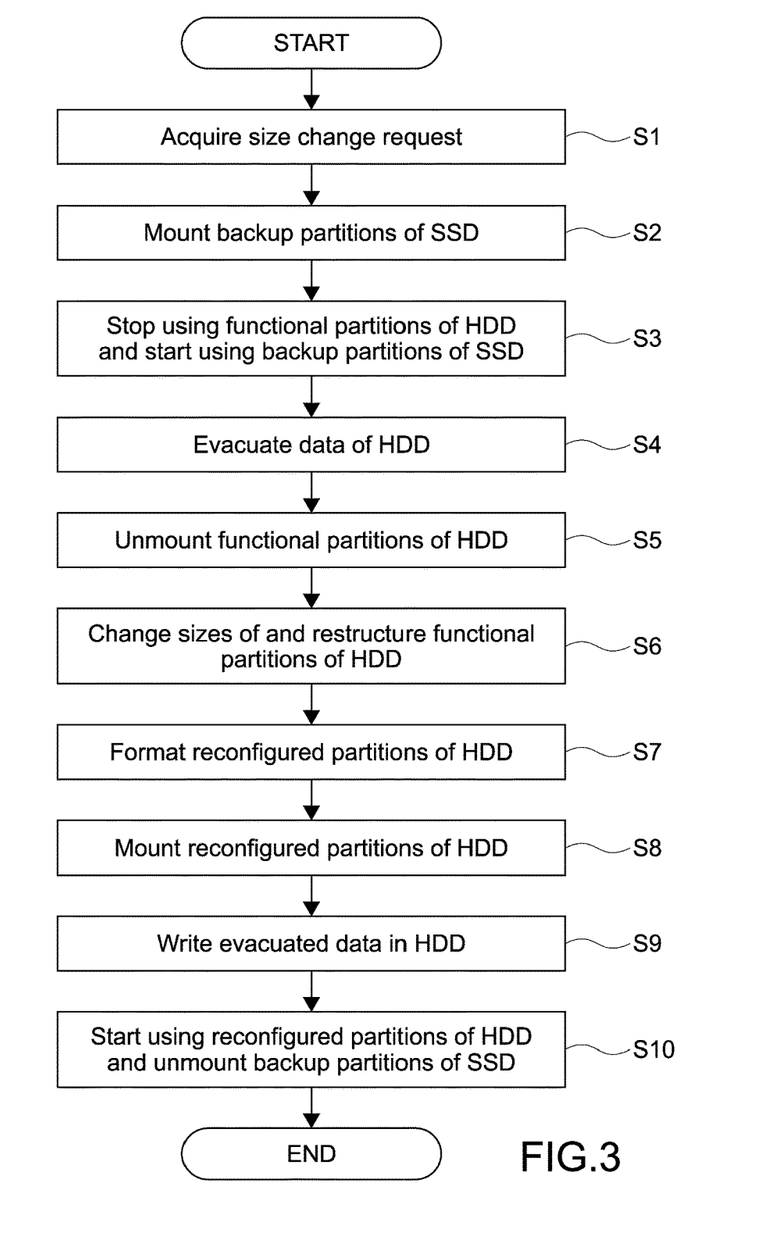
FIG. 3 shows steps of HDD partition size change processing.

FIG. 3 shows steps of the HDD partition size change processing. FIGS. 4 to 13 schematically show the steps of the HDD partition size change processing, respectively.

As a normal operation, the system control unit 11 uses the functional partitions A to D of the HDD 14 for executing a plurality of different functions of application software (indicated by bold line in figure; same holds true in subsequent figures). The system control unit 11 also uses the system partitions E to H of the SSD 15 for executing a plurality of different functions of system software.

Figure 4:
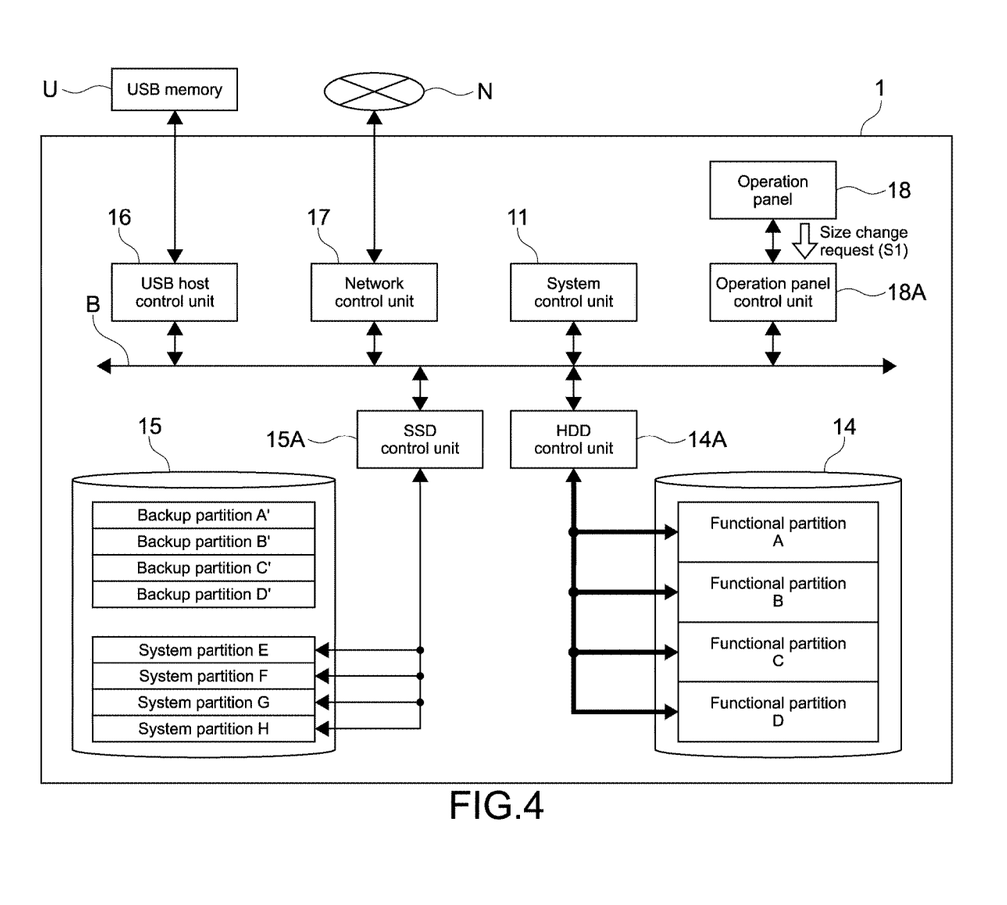
FIG. 4 schematically shows Step S1 of the HDD partition size change processing.

The system control unit 11 acquires a specific user operation manually input via the operation panel 18 as a size change request (Step S1, FIG. 4). The "size change request" is a request to change the size of at least one of the functional partitions A to D of the HDD 14. For example, it is assumed that a request for reducing the functional partition C for a FAX box and the functional partition D for a user application work and enlarging the functional partition B for a user box in the HDD 14 is input as the "size change request".

Figure 5:
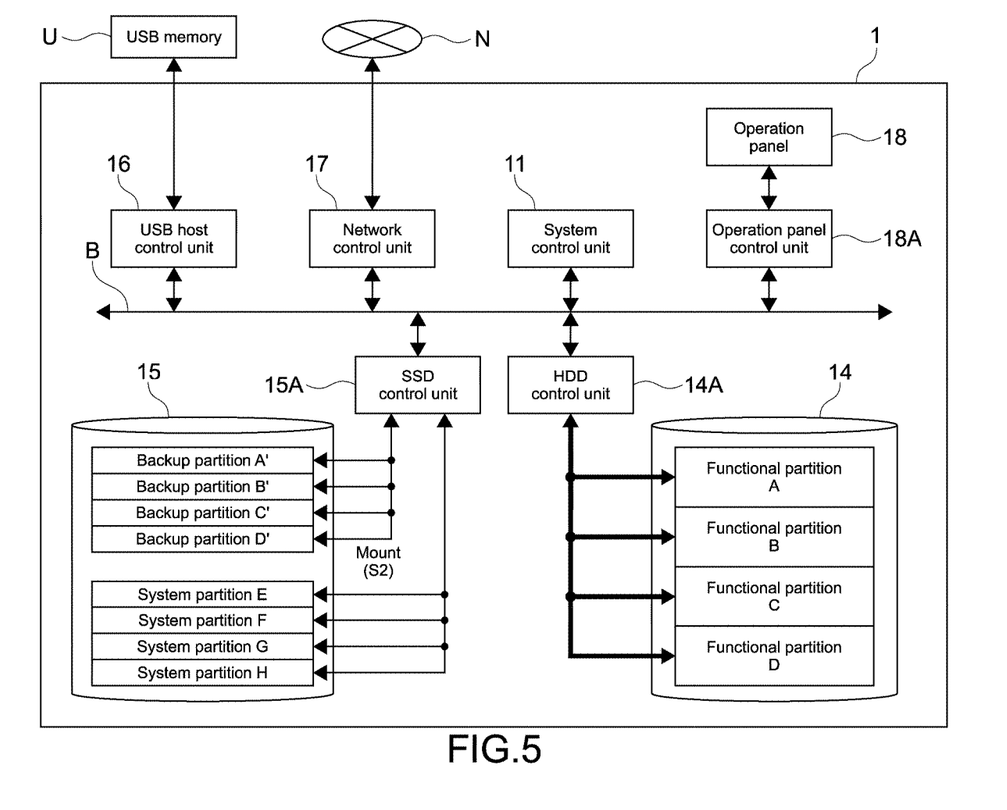
FIG. 5 schematically shows Step S2 of the HDD partition size change processing.

Upon acquiring the size change request, the system control unit 11 recognizes the backup partitions A' to D' of the SSD 15 and sets them to a usable state (mount) (Step S2, FIG. 5). During mounting of the backup partitions A' to D' of the SSD 15, the system control unit 11 continues using the functional partitions A to D of the HDD 14 for executing the functions of the application software.

Figure 6:
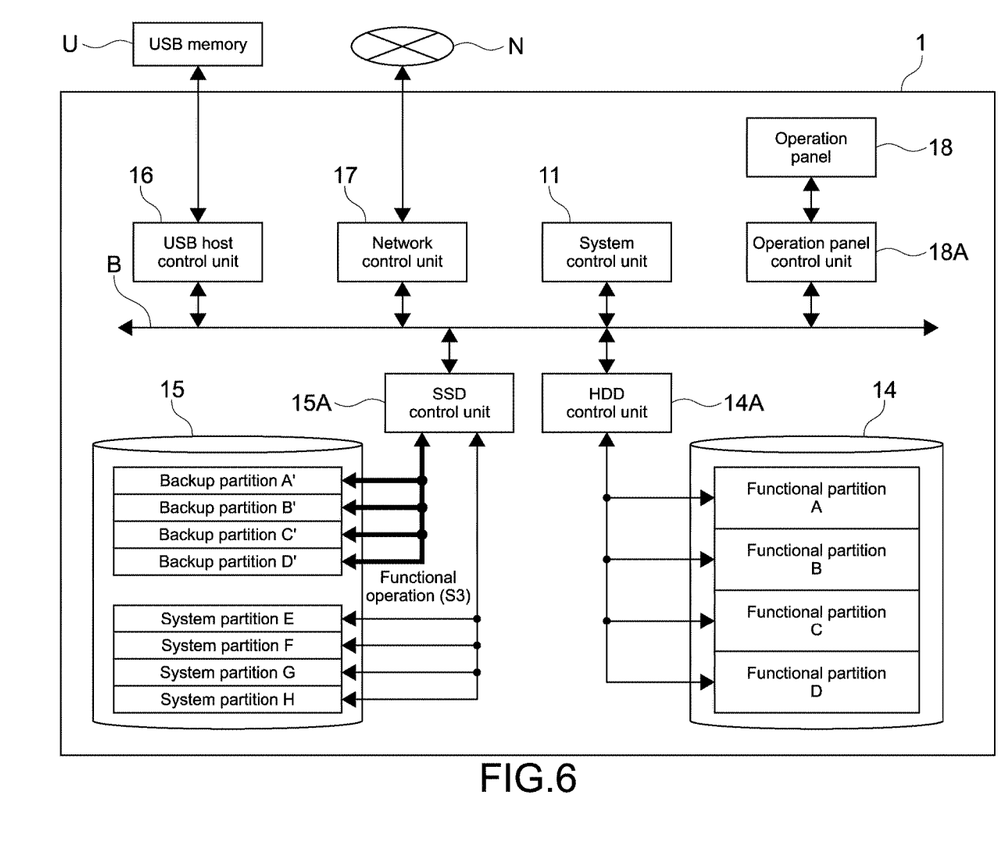
FIG. 6 schematically shows Step S3 of the HDD partition size change processing.

As the mounting of the backup partitions A' to D' of the SSD 15 is ended, the system control unit 11 stops using the functional partitions A to D of the HDD 14 and starts using the backup partitions A' to D' of the SSD 15 for executing the functions of the application software (Step S3, FIG. 6).

Figure 7:
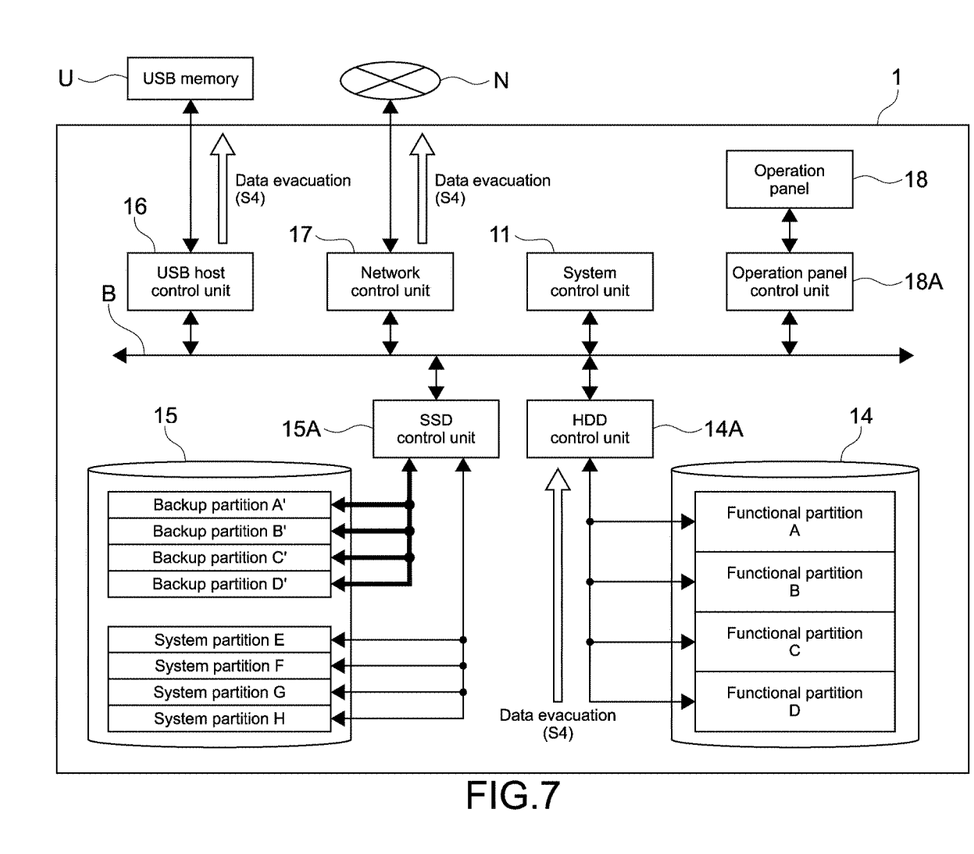
FIG. 7 schematically shows Step S4 of the HDD partition size change processing.

Subsequently, the system control unit 11 stores (evacuates) data already stored in the functional partitions A to D of the HDD 14 in an external storage apparatus (Step S4, FIG. 7). The "external storage apparatus" is typically the USB memory U or a server apparatus (not shown) connected via the network N.

Figure 8:
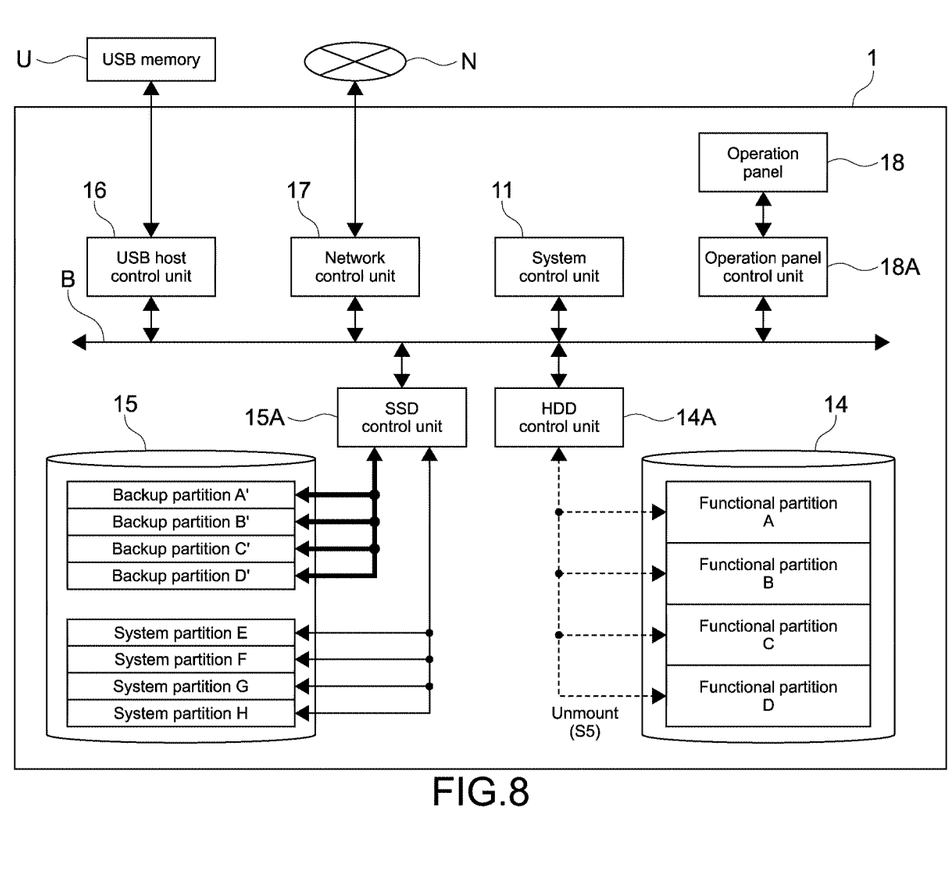
FIG. 8 schematically shows Step S5 of the HDD partition size change processing.

As the data evacuation ends, the system control unit 11 cancels the recognition of the functional partitions A to D of the HDD 14 and sets them to an unusable state (unmount) (Step S5, FIG. 8).

Figure 9:
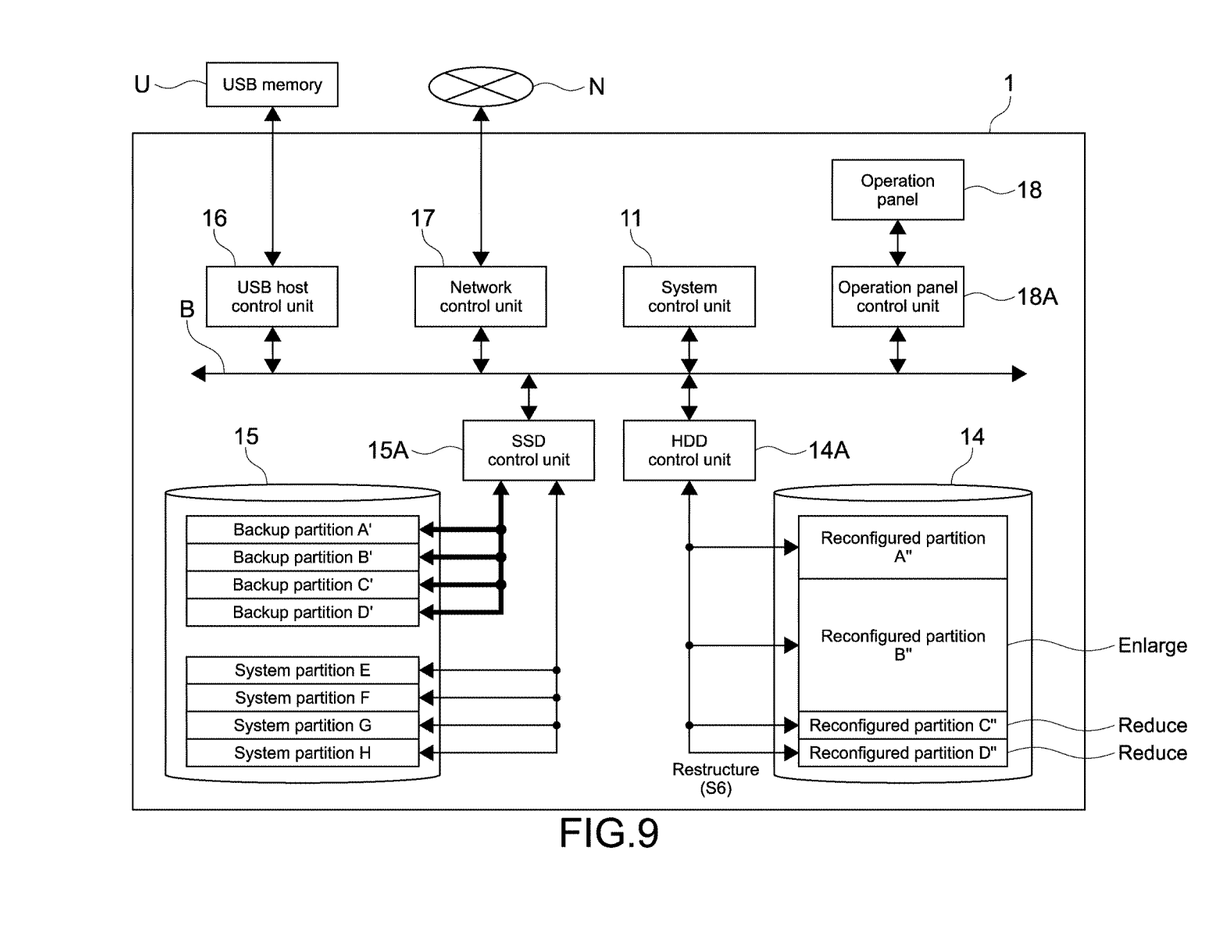
FIG. 9 schematically shows Step S6 of the HDD partition size change processing.

As the mounting of the HDD 14 ends, the system control unit 11 changes the sizes of (reconfigures) the functional partitions A to D of the HDD 14 (Step S6, FIG. 9). For example, the system control unit 11 changes the sizes of (reconfigures) the functional partitions A to D of the HDD 14 by reducing the sizes of the functional partitions C and D and enlarging the size of the functional partition B based on the size change request (Step S1). It should be noted that the total storage capacity of the functional partitions A to D before the change of sizes and that of the functional partitions after the change of sizes (reconfigure) (hereinafter, referred to as "reconfigured partitions A" to D") are the same.

Figure 10:
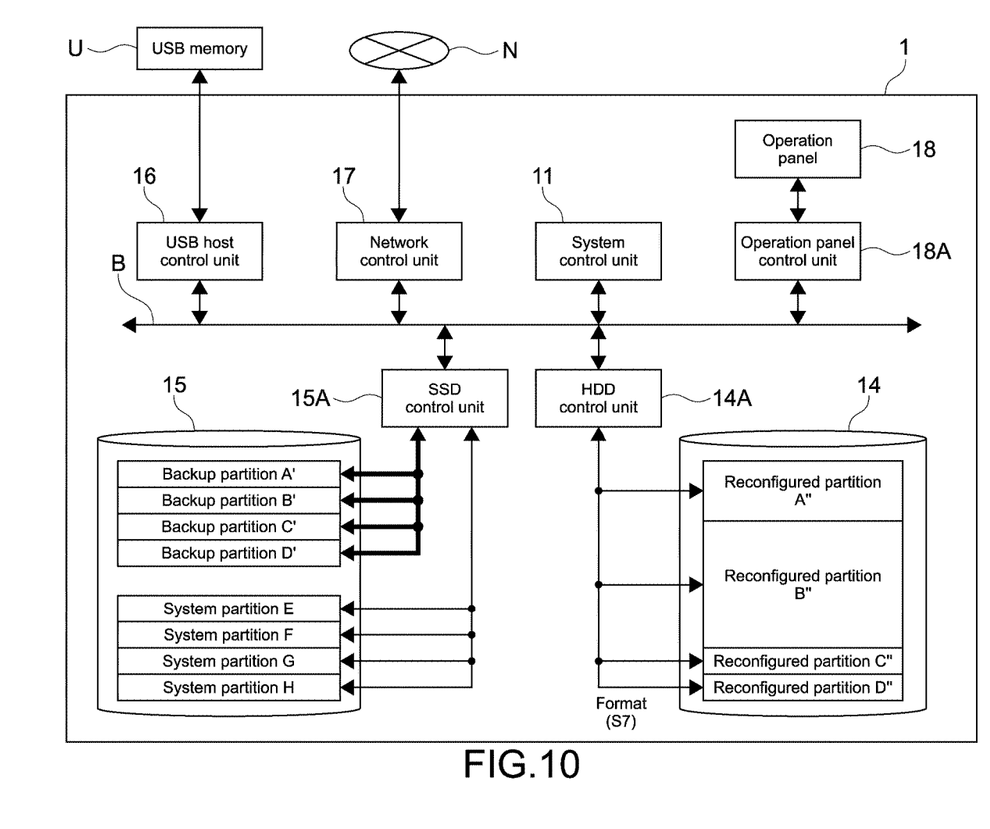
FIG. 10 schematically shows Step S7 of the HDD partition size change processing.

Next, the system control unit 11 formats the reconfigured partitions A" to D" (Step S7, FIG. 10).

Figure 11:
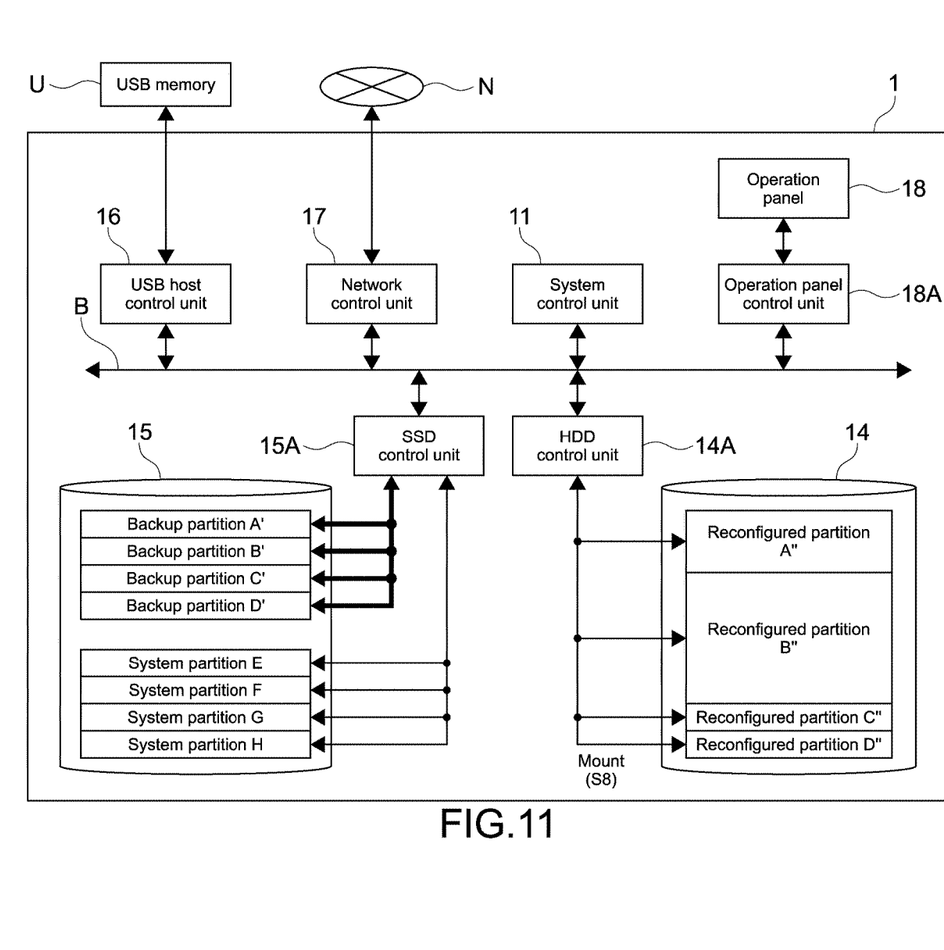
FIG. 11 schematically shows Step S8 of the HDD partition size change processing.

Upon ending the formatting, the system control unit 11 recognizes the reconfigured partitions A" to D" of the HDD 14 and sets them to a usable state (mount) (Step S8, FIG. 11).

Figure 12:
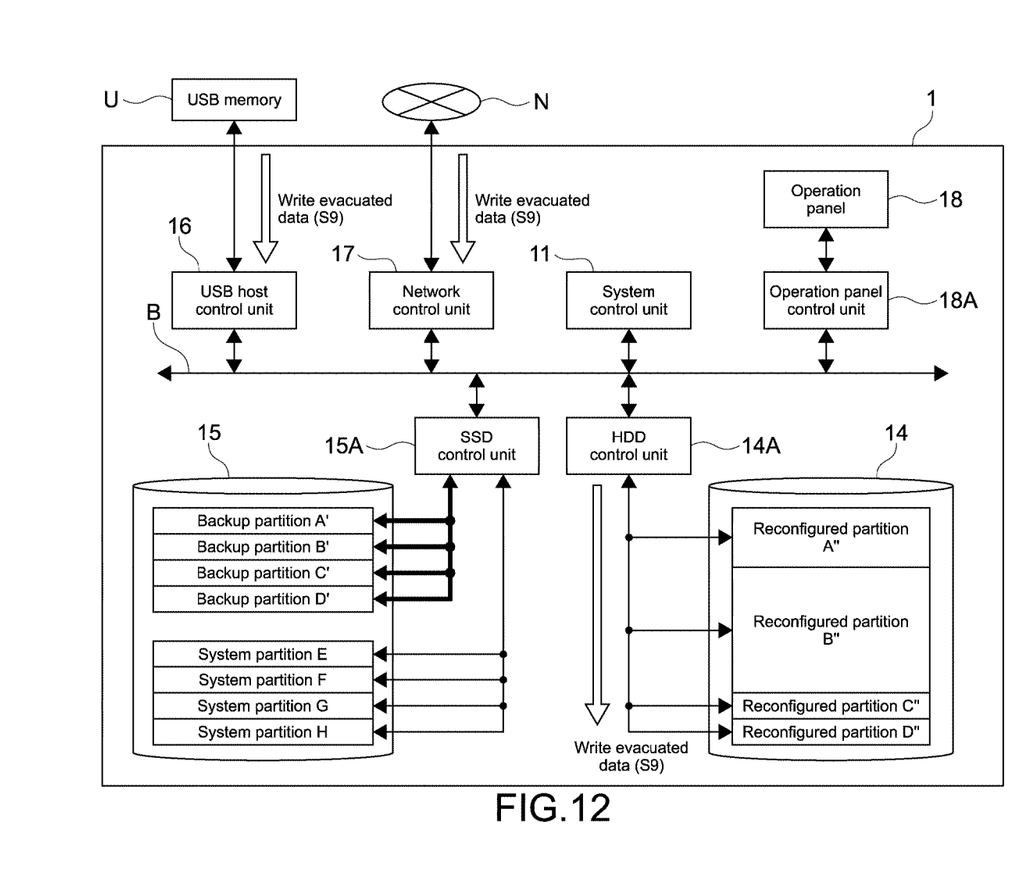
FIG. 12 schematically shows Step S9 of the HDD partition size change processing.

As the mounting of the reconfigured partitions A" to D" is ended, the system control unit 11 rewrites the data stored (evacuated) in the external storage apparatus (Step S4) in the HDD 14 (Step S9, FIG. 12). Specifically, the system control unit 11 rewrites the data evacuated from the functional partition A of the HDD 14 in the reconfigured partition A", the data evacuated from the functional partition B in the reconfigured partition B", the data evacuated from the functional partition C in the reconfigured partition C", and the data evacuated from the functional partition D in the reconfigured partition D".

In addition, after rewriting the data stored (evacuated) in the external storage apparatus in the HDD 14, the system control unit 11 may write data that has been stored in the SSD 15 during the series of partition size change processing (Steps S3 to S8) in the HDD 14. Also in this case, the system control unit 11 writes the data stored in the backup partition A' of the SSD 15 in the reconfigured partition A", the data stored in the backup partition B' in the reconfigured partition B", the data stored in the backup partition C' in the reconfigured partition C", and the data stored in the backup partition D' in the reconfigured partition D.

Upon ending the rewrite in the HDD 14 (writing of data of SSD 15 in HDD 14 when writing data stored in SSD 15 in HDD 14), the system control unit 11 starts using the HDD 14 again instead of using the backup partitions A' to D' of the SSD 15 for executing the functions of the application software. Specifically, the system control unit 11 starts (resumes) using the reconfigured partitions A" to D" of the HDD 14 for executing the functions of the application software. Then, the system control unit 11 cancels the recognition of the backup partitions A' to D' of the SSD 15 and sets them to an unusable state (unmount) (Step S10, FIG. 13).

5. CONCLUSION

According to this embodiment, the sizes of the functional partitions A to D of the HDD 14 can be changed (reduced/enlarged) according to the user's needs (usage condition of MFP 1). Accordingly. the functional partitions A to D of the HDD 14 can be customized to sizes that match the user's needs (usage condition of MFP 1).

For changing partition sizes, it is necessary to evacuate data stored in each partition and reconfigure and format each partition. Typically, an electronic apparatus cannot be operated during such a series of size change processing.

In contrast, according to this embodiment, by using the backup partitions A' to D' of the SSD 15 as partitions prepared preliminarily (alternatively) during the series of size change processing of the functional partitions A to D of the HDD 14, the MFP 1 becomes operable during the series of size change processing. As a result, the user can use the MFP 1 as usual without being aware that the series of size change processing is being carried out on the functional partitions A to D of the HDD 14.

Upon ending the size change processing, the system control unit 11 rewrites the data that has been stored (evacuated) in the external storage apparatus from the HDD 14, in the HDD 14 (Step S9). By rewriting the data in the mainly-used HDD 14, the user can access the data easily.

The system control unit 11 also writes the data that has been stored in the SSD 15 during the size change processing in the HDD 14. Accordingly, the newest data is stored in the partitions of the HDD 14. By writing data in the HDD 14 whose partition sizes are changed to sizes that match the user's needs (usage condition of MFP 1), the capacity of the auxiliary (alternative) SSD 15 can be secured.

Figure 13:
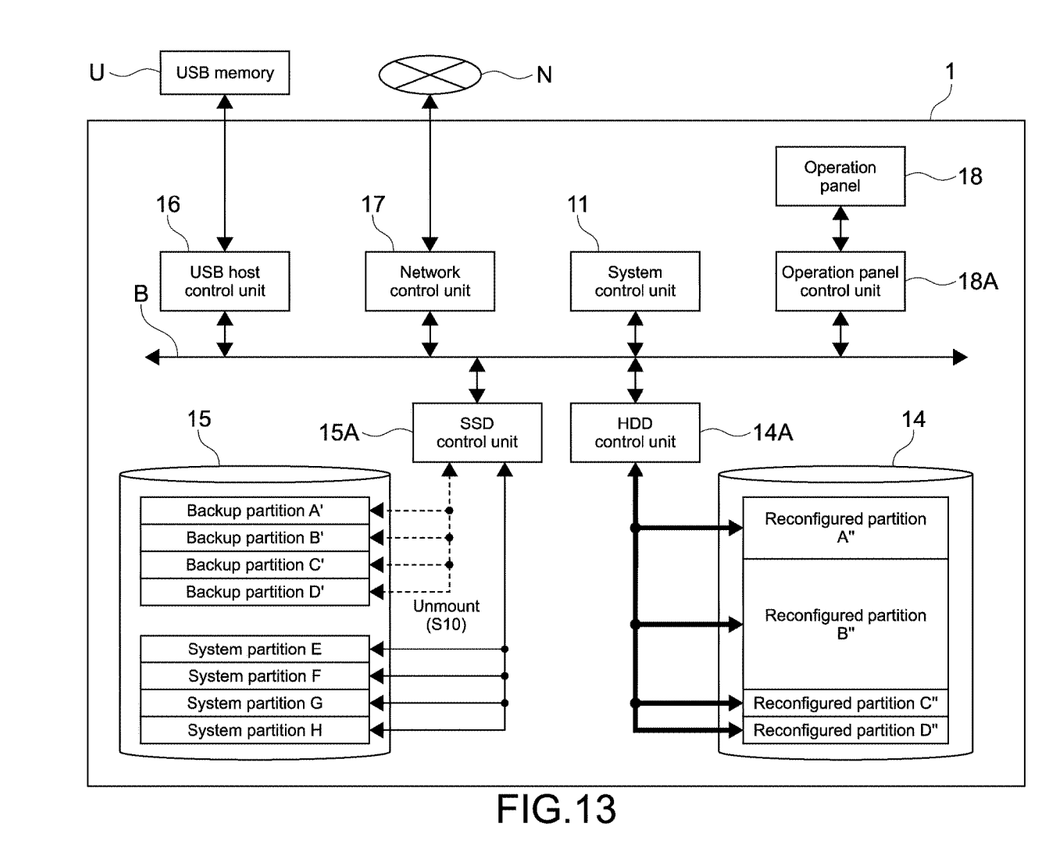
FIG. 13 schematically shows Step S10 of the HDD partition size change processing.

Upon ending the size change processing, the system control unit 11 uses the HDD 14 whose partition sizes have been changed to sizes that match the user's needs (usage condition of MFP 1) instead of the auxiliary (alternative) SSD 15 for executing the functions of the application software (Step S10). After that, even when data is written in the HDD 14, since the size of the partition having a high degree of importance is enlarged, there is no fear that the partition of the HDD 14 will be occupied more than necessary. Therefore, certainty of the operation of the MFP 1 increases.

6. MODIFIED EXAMPLE

In this embodiment, the system control unit 11 acquires a specific user operation manually input via the operation panel 18 as the size change request (Step S1). In contrast, in a modified example, the system control unit 11 acquires the size change request by detecting that a use frequency of a specific function is significantly low.

For example, when detecting that the use frequency of the facsimile function is significantly low (including case where function is not used at all), the system control unit 11 assumes it as an acquisition of a size change request. There are the following specific examples regarding the method of detecting that the use frequency of the facsimile function is significantly low (including case where function is not used at all) by the system control unit 11.

The system control unit 11 detects that the use frequency of the facsimile function within a specific period (relatively-long period (e.g., 1 year)) is equal to or smaller than a specific value (e.g., once/month).

The system control unit 11 detects that a facsimile board (substrate) as the FAX control unit 20A, on which a dedicated hardware circuit is mounted, is not installed in the MFP 1 or has been removed from the MFP 1 (i.e., facsimile function is not used at all).

The system control unit 11 detects that the user has operated a facsimile function OFF button displayed on the operation panel 18 (i.e., facsimile function is not used at all).

In the modified example, the system control unit 11 acquires the size change request by detecting that the use frequency of the facsimile function is significantly low (Step S1). In this case, the system control unit 11 reduces the size of the functional partition C for a FAX box and enlarges the size of at least another one partition only by the reduced amount (Step S6). It should be noted that even when the facsimile function is currently not used at all, the possibility of the facsimile function being used in the future cannot be denied. Therefore, it is better to secure a minimum size of the functional partition C. It should be noted that the number or priority levels of the functional partitions for which sizes are to be enlarged only need to be set in advance.

According to the modified example, it becomes possible to reconfigure the sizes of the functional partitions A to D of the HDD 14 to sizes that match the usage condition of the MFP 1 without the user being aware and having to proactively input a size change request via the operation panel 18.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic apparatus, comprising:
a first storage unit divided into a plurality of first partitions that are used for respectively executing a plurality of different functions;
a second storage unit different from the first storage unit; and
a processor that
acquires a size change request for changing a size of at least one of the first partitions,
carries out processing for changing the size of at least one of the first partitions upon acquiring the size change request, and
uses the second storage unit in executing at least one of the functions during the size change processing,
wherein
the second storage unit is divided into a plurality of second partitions,
the plurality of second partitions respectively correspond to the plurality of different functions that are executed using the plurality of first partitions, and
the processor uses, in executing at least one of the functions during the size change processing, a second partition corresponding to a function to be executed, and
wherein the processor
upon acquiring the size change request, evacuates data stored in the plurality of first partitions in an external storage apparatus, and thereafter starts the size change processing, and
upon ending the size change processing, rewrites the data evacuated in the external storage apparatus in the plurality of first partitions, and thereafter writes data that has been stored in the second partition during the size change processing in a first partition corresponding to the second partition.

2. The electronic apparatus according to claim 1,
wherein the processor
acquires the size change request by detecting that a use frequency of a specific function is low,
carries out, upon acquiring the size change request, processing for reducing a size of a specific first partition used for executing the specific function, and
carries out processing for enlarging the size of at least another one first partition only by a reduced amount.

3. The electronic apparatus according to claim 1,
wherein the processor resumes, upon ending the size change processing, the use of the first storage unit in executing at least one of the functions.

4. The electronic apparatus according to claim 1,
wherein the processor writes, upon ending the size change processing, data that has been stored in the second storage unit during the size change processing in the first storage unit.

5. An electronic apparatus, comprising:
a first storage unit divided into a plurality of first partitions that are used for respectively executing a plurality of different functions;
a second storage unit different from the first storage unit; and
a processor that
acquires a size change request for changing a size of at least one of the first partitions, carries out processing for changing the size of at least one of the first partitions upon acquiring the size change request, and uses the second storage unit in executing at least one of the functions during the size change processing, wherein the second storage unit is divided into a plurality of second partitions, the plurality of second partitions respectively correspond to the plurality of different functions that are executed using the plurality of first partitions, and the processor uses, in executing at least one of the functions during the size change processing, a second partition corresponding to a function to be executed, and wherein the processor stores, upon acquiring the size change request, data stored in the first storage unit in an external storage apparatus, and rewrites, upon ending the size change processing, the data that has been stored in the external storage apparatus in the first storage unit.

6. An electronic apparatus, comprising:

a first storage unit divided into a plurality of first partitions that are used for respectively executing a plurality of different functions;

a second storage unit different from the first storage unit; and a processor that acquires a size change request for changing a size of at least one of the first partitions, carries out processing for changing the size of at least one of the first partitions upon acquiring the size change request, and uses the second storage unit in executing at least one of the functions during the size change processing, wherein the second storage unit is divided into a plurality of second partitions, the plurality of second partitions respectively correspond to the plurality of different functions that are executed using the plurality of first partitions, and the processor uses, in executing at least one of the functions during the size change processing, a second partition corresponding to a function to be executed, and wherein the processor limits a data amount to be handled in each of the plurality of second partitions.

7. An electronic apparatus, comprising:

a first storage unit divided into a plurality of first partitions that are used for respectively executing a plurality of different functions;

a second storage unit different from the first storage unit; and a processor that acquires a size change request for changing a size of at least one of the first partitions, carries out processing for changing the size of at least one of the first partitions upon acquiring the size change request, and uses the second storage unit in executing at least one of the functions during the size change processing, wherein the second storage unit is divided into a plurality of second partitions, the plurality of second partitions respectively correspond to the plurality of different functions that are executed using the plurality of first partitions, and the processor uses, in executing at least one of the functions during the size change processing, a second partition corresponding to a function to be executed, and wherein the first storage unit is divided into the plurality of first partitions, the plurality of first partitions being used for respectively executing a plurality of different functions of application software, and the second storage unit is divided into the plurality of second partitions and a plurality of third partitions, the plurality of third partitions being used for respectively executing a plurality of different functions of system software.

8. An information processing method executed by a processor of an electronic apparatus including a first storage unit divided into a plurality of first partitions that are used for respectively executing a plurality of different functions and a second storage unit different from the first storage unit, the information processing method comprising:

acquiring a size change request for changing a size of at least one of the first partitions;

carrying out processing for changing the size of at least one of the first partitions upon acquiring the size change request; and using the second storage unit in executing at least one of the functions during the size change processing, wherein the second storage unit is divided into a plurality of second partitions, the plurality of second partitions respectively correspond to the plurality of different functions that are executed using the plurality of first partitions, and the information processing method includes using, in executing at least one of the functions during the size change processing, a second partition corresponding to a function to be executed, and wherein the information processing method further comprises upon acquiring the size change request, evacuating data stored in the plurality of first partitions in an external storage apparatus, and thereafter starting the size change processing, and upon ending the size change processing, rewriting the data evacuated in the external storage apparatus in the plurality of first partitions, and thereafter writing data that has been stored in the second partition during the size change processing in a first partition corresponding to the second partition.

9. The information processing method according to claim 8, wherein the processor limits a data amount to be handled in each of the plurality of second partitions.

10. The information processing method according to claim 8, wherein the first storage unit is divided into the plurality of first partitions, the plurality of first partitions being used for respectively executing a plurality of different functions of application software, and the second storage unit is divided into the plurality of second partitions and a plurality of third partitions, the plurality of third partitions being used for respectively executing a plurality of different functions of system software.

11. A non-transitory computer readable recording medium that records an information processing program executable by a computer of an electronic apparatus including a first storage unit divided into a plurality of first partitions that are used for respectively executing a plurality of different functions and a second storage unit different from the first storage unit, the program causing the computer of the electronic apparatus to:

acquire a size change request for changing a size of at least one of the first partitions;

carry out processing for changing the size of at least one of the first partitions upon acquiring the size change request; and use the second storage unit in executing at least one of the functions during the size change processing, wherein the second storage unit is divided into a plurality of second partitions, the plurality of second partitions respectively correspond to the plurality of different functions that are executed using the plurality of first partitions, and the program causes the computer of the electronic apparatus to use, in executing at least one of the functions during the size change processing, a second partition corresponding to a function to be executed, and wherein the program causes the computer of the electronic apparatus to upon acquiring the size change request, evacuate data stored in the plurality of first partitions in an external storage apparatus, and thereafter start the size change processing, and upon ending the size change processing, rewrite the data evacuated in the external storage apparatus in the plurality of first partitions, and thereafter write data that has been stored in the second partition during the size change processing in a first partition corresponding to the second partition.

12. The non-transitory computer readable recording medium according to claim 11, wherein the program causes the computer of the electronic apparatus to limit a data amount to be handled in each of the plurality of second partitions.

13. The non-transitory computer readable recording medium according to claim 11, wherein the first storage unit is divided into the plurality of first partitions, the plurality of first partitions being used for respectively executing a plurality of different functions of application software, and the second storage unit is divided into the plurality of second partitions and a plurality of third partitions, the plurality of third partitions being used for respectively executing a plurality of different functions of system software.

* * * * *